(12) United States Patent
Kelso et al.

(10) Patent No.: US 8,131,765 B2
(45) Date of Patent: Mar. 6, 2012

(54) APPARATUS, SYSTEM AND METHOD FOR CACHING WRITES BY MULTIPLE CLIENTS TO A VIRTUALIZED COMMON DISK IMAGE

(75) Inventors: Scott Edwards Kelso, Cary, NC (US); John Carl Mese, Cary, NC (US); Nathan J. Peterson, Raleigh, NC (US); Rod D. Waltermann, Rougemont, NC (US); Arnold S. Weksler, Raleigh, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 579 days.

(21) Appl. No.: 12/251,122

(22) Filed: Oct. 14, 2008

(65) Prior Publication Data

US 2010/0094825 A1   Apr. 15, 2010

(51) Int. Cl.
*G06F 7/00* (2006.01)

(52) U.S. Cl. ...................................................... 707/786

(58) Field of Classification Search .................. 707/786, 707/755, 641
See application file for complete search history.

(56) References Cited

U.S. PATENT DOCUMENTS

| 2004/0215919 | A1* | 10/2004 | Emmes | ......................... 711/208 |
| 2006/0004795 | A1* | 1/2006 | Shah et al. | ..................... 707/100 |
| 2007/0271307 | A1 | 11/2007 | Bergsten | |

* cited by examiner

*Primary Examiner* — Truong Vo
(74) *Attorney, Agent, or Firm* — Kunzler Needham Massey & Thorpe (57) ABSTRACT

An apparatus, system, and method are disclosed for storage write caching. A storage address translation table is used to overlay a user image and a common image. A storage driver stack module receives a storage access call and generates a storage access request with a requested file path and a requested storage address. A storage mapper module receives the storage access request, accesses the storage address translation table, and looks up a matching entry in the storage address translation table where the requested file path matches a saved file path and the requested storage address matches a saved common storage address, and maps a saved user storage address from the matching entry if a match exists.

25 Claims, 7 Drawing Sheets

| STORAGE ADDRESS TRANSLATION TABLE | | | | |
|---|---|---|---|---|
| MFT | FILE PATH | HASH | COMMON | USER |
| N | C:\WINDOWS\FILE1 | 9FCBD2 | 05 - 06 | C05 - C06 |
| N | C:\WINDOWS\FILE2 | D6B403 | 08 - 08 | C08 - C08 |
| Y | C:\WINDOWS\FILE3 | C52DA8 | 0E - 0F | C0E - C0F |
| N | C:\WINDOWS\FILE4 | 1A9B01 | 11 - 11 | C11 - C11 |

FIG. 6

| STORAGE ADDRESS UPDATE TABLE | | | | |
|---|---|---|---|---|
| MFT | FILE PATH | HASH | COMMON | USER |
| N | C:\WINDOWS\FILE5 | A3F8D7 | 00 - 00 | C14 - C14 |
| N | C:\WINDOWS\FILE1 | 9FCBD2 | 06 - 06 | C15 - C15 |
| N | C:\WINDOWS\FILE6 | 83F8D7 | 09 - 09 | C16 - C16 |
| Y | C:\WINDOWS\FILE3 | C52DA8 | 0E - 0E | C17 - C17 |

APPARATUS, SYSTEM AND METHOD FOR CACHING WRITES BY MULTIPLE CLIENTS TO A VIRTUALIZED COMMON DISK IMAGE

BACKGROUND

1. Field

This invention relates to shared virtual storage and more particularly relates to storage write caching.

2. Description

Computer system virtualization derives its efficiency from the sharing of common physical resources among multiple virtual computers, such as diskless user clients sharing a common disk image on a storage area network ("SAN"). However, it has proven difficult to preserve the coherency of the shared resources in the face of local user modifications and global maintenance updates, without significantly degrading the efficiency of the overall system.

Common image solutions today are typically implemented in one of two ways. One is to allow read-only access to the common image. Any writes or changes are cached in memory, and lost when the user shuts down. These solutions require s SAN or a network-attached storage ("NAS") to allow the end user to access a location on the SAN or NAS to store their data.

The second method is to separate the writes from the reads at a block or sector level. This relies on a rigid block structure arrangement, which negates any user changes when the common image is updated, such as by applying a patch.

Some vendors propose application streaming as a method for applying a patch to the operating system ("OS") image for the second method. Application streaming is a method to dynamically apply an overlay to the common image to allow that application or patch to run. This approach has the disadvantage that each application or patch that is streamed imposes overhead above the application or patch itself. This merely delays the need to update the common image. Eventually the point is reached where there is such a large amount of streaming that it overwhelms the system, and hinders performance.

Thus it can be seen that high overhead, inefficiency, and the resulting overall poor performance have been the perennial challenges for storage write caching in a shared virtual storage environment.

SUMMARY OF THE INVENTION

From the foregoing discussion, it should be apparent that a need exists for an apparatus, system, and method that streamlines storage write caching to a virtualized common disk image. Beneficially, such an apparatus, system, and method would handle both user modifications and maintenance updates.

The present invention has been developed in response to the present state of the art, and in particular, in response to the problems and needs in the art that have not yet been fully solved by currently available common disk image technology. Accordingly, the present invention has been developed to provide an apparatus, system, and method for storage write caching that overcome many or all of the above-discussed shortcomings in the art.

The present invention utilizes a table-driven approach embedded in the storage virtualization layer of a hypervisor control domain. It may be implemented at the firmware level for minimum overhead.

The apparatus to cache storage writes is provided with a plurality of modules configured to functionally execute the necessary steps of mapping a requested storage address to either the common or locally cached user copy of the requested data by accessing an efficiently indexed look-up mechanism. The user image and the common image are congruent, so as to simply overlay each other to yield a virtual drive image. These modules in the described embodiments include a storage address translation table module, a storage driver stack module, and a storage mapper module. The storage mapper module receives a storage access request from the storage driver module in response to a storage access call via an application programming interface, and looks up a matching entry in the storage address translation table.

The apparatus, in one embodiment, is configured to divide the user image into a common area and a user local area which respectively overlay the common data and a free area comprising the common image, yielding the user's virtual drive image.

The storage driver stack module of the apparatus is further configured, in one embodiment, to comprise at least one of a file system driver module, a filter driver module, and a device driver module. At the highest level, the file system driver module receives a storage access call via an application programming interface, and maps the requested file path to a virtual storage address. The filter driver module then maps the virtual storage address to the requested storage address within the common storage address range if the requested file path is an operating system file path, and within the user storage address range if otherwise. In an embodiment, the common storage address range and the user storage address range comprise disjoint ranges within a single physical storage address space. Corresponding virtual address ranges within a virtual storage address space may be similarly disjoint, and thus may be distinguished on the basis of the virtual storage address, thereby determining whether or not the requested file path is an operating system file path. Lastly, a device driver module generates device-specific commands in response to the storage access request.

In a further embodiment, the apparatus may be configured, for example, to generate a hash of the file path to improve the efficiency of the storage mapper module look-up operation. There are other efficient lookup data structures known in the art that could be employed. Additional efficiency may be achieved for the Windows operating system by providing a Master File Table ("MFT") flag to indicate whether the requested file path specifies a file that is MFT-resident rather than actually residing at the requested storage address.

A system of the present invention is also presented to cache storage writes. The system may be embodied as a plurality of computers upon which to run the foregoing modules and a storage subsystem comprising the foregoing storage areas. In particular, the system, in one embodiment, includes a virtual drive image for each computer corresponding to its user storage area overlaid on the common storage area.

The system may further include a storage subsystem, such as a SAN. The plurality of computers may be comprised of blades, diskless workstations, call center workstations, thin clients, hybrid clients, and POS terminals. A hybrid client is one which possesses a small amount of onboard storage, such as might be provisioned for the user common storage area, but otherwise operates as a diskless client, relying upon the storage subsystem to provide the more voluminous common storage area and user local storage area.

A method of the present invention is also presented for storage write caching. The method in the disclosed embodiments substantially includes the steps necessary to carry out the functions presented above with respect to the operation of the described apparatus and system. In one embodiment, the method includes receiving the storage access request, accessing the storage address translation table, looking up a matching entry, and mapping or passing through the request accordingly. The method also may include checking whether the requested storage address falls within the user local storage address range, thereby implying that the matching entry does not exist without having to perform the step of accessing the storage address translation table.

In a further embodiment, the method includes reading or writing the data as requested. In the case of a write, a matching entry in the storage address translation table may be created if none exists, as well as provisioning and allocating a thin region of physical storage as needed.

A physical update intended for all users may be applied to the common image without first overlaying any user image. To perform such a global update in virtual mode would be very cumbersome, requiring each user's virtual image to be updated separately. To support the maintenance of the common image in physical mode, a storage address update table may be provided, having a format like that of the storage address translation table, for recording the maintenance updates. Intersections between the two tables are then indicative of needed repairs to the user image and the storage address translation table. Once the repairs are accomplished, the storage address update table may be deleted.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
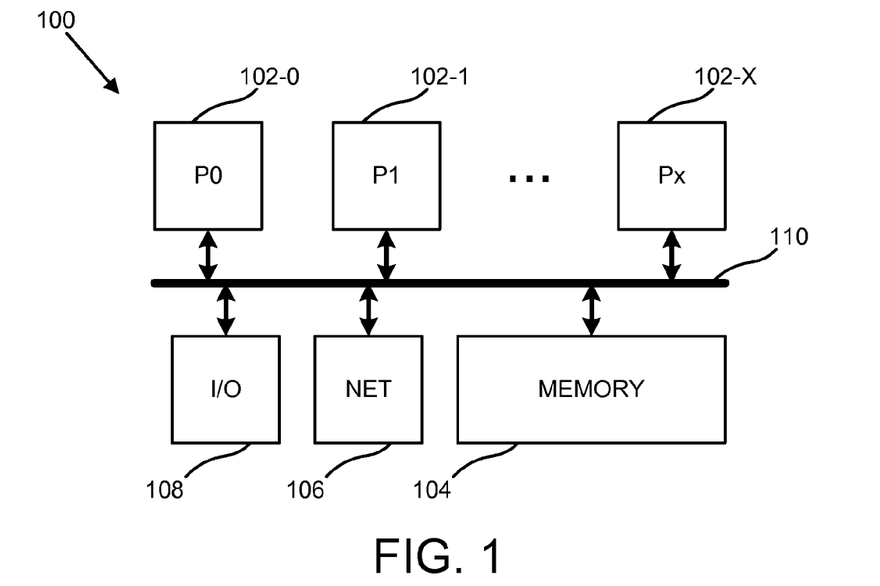
FIG. 1 is a schematic block diagram illustrating a possible computer hardware platform upon which the present invention may be at least in part deployed.

FIG. 1 illustrates a possible computer hardware platform 100 upon which the present invention may be at least in part deployed. The hardware platform 100 may include processor(s) 102, memory 104, a network interface 106, and an input/output device interface 108, connected through a bus 110.

The hardware platform 100 may be of any form factor or type, including an embedded system, a handheld, a notebook, a personal computer, a minicomputer, a server, a mainframe, a supercomputer, and the like.

The processor(s) 102 may be present in any quantity, including a uniprocessor, and may have any instruction set architecture. In an embodiment, the processor(s) 102 may have one or more levels of dedicated or shared caches. Possible physical implementations may include multi-chip, single chip, multi-core, hyperthreaded processors, and the like.

The memory 104 may be of any size or organization and may include both read/write and read-only sections. It may also include both global and local sections, and may support both uniform and non-uniform access. It may incorporate memory-mapped I/O and direct memory access. It may support cache coherency, including directory-based and snoop-based protocols.

The network interface 106 may support any network protocol or architecture. It may support both wireless and hard-wired network connections. It may comprise Ethernet, Token Ring, System Network Architecture ("SNA"), and the like. In one embodiment, it may be integrated with the input/output device interface 108.

The input/output device interface 108 may be driven primarily by the processor(s) 102 or may incorporate an independent I/O processor subsystem. It may comprise Peripheral Component Interconnect ("PCI"), Small Computer System Interface ("SCSI"), Fiberchannel ("FC"), Enterprise System Connection ("ESCON"), ESCON over Fiberchannel ("FICON"), and the like. In an embodiment, it may include dedicated local I/O devices.

The bus 110 may comprise one or more of a variety of physical and logical topologies. It may be parallel or serial. It may be unidirectional or bidirectional. It may be flat or hierarchical. It may comprise a full or partial crossbar. It may comprise multiple bridged busses. In an embodiment, the bus 110 may comprise a high-speed internal network.

Figure 2:
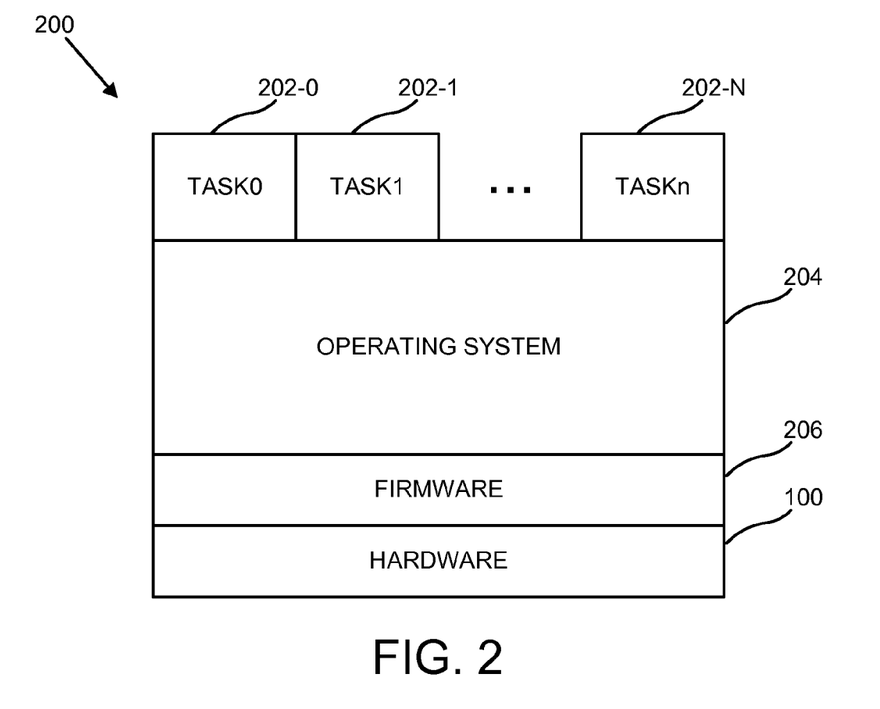
FIG. 2 is a schematic block diagram of a possible computer including a software stack in which the present invention may at least in part reside.

FIG. 2 is a diagram of a possible computer 200 including a software stack in which the present invention may at least in part reside. The software stack may include task(s) 202, hosted on an operating system 204, enabled by firmware 206, running on a hardware platform 100 of which the configuration of FIG. 1 is representative.

The task(s) 202 may include both user- and system-level tasks. They may be interactive or batch. They may run in the foreground or background. User-level task(s) 202 may include applications, programs, jobs, middleware, and the like. System-level task(s) 202 may include services, drivers, daemons, utilities, and the like.

The operating system 204 may be of any type and version and in any state. Types may include Unix, Linux, Windows, Mac, MVS, VMS, and the like. Versions may include Windows XP, Windows Vista, and the like. States may include a degree of customization, a mode of operation, a system preparation for setup, and the like. The operating system 204 may be single-user or multi-user. It may be single-tasking or multi-tasking. In an embodiment, the operating system 204 may be real-time. In another embodiment, the operating system 204 may be embedded.

The firmware 206 may comprise microcode, which may reside in a microstore of the processor(s) 102. In an embodiment, the firmware 206 may comprise low-level software, which may reside in memory 104. In one embodiment, the firmware 206 may comprise a rudimentary operating system 204. In a further embodiment, the firmware 206 may support virtualization so as to permit the concurrent operation of multiple operating systems 204 on a hardware platform 100.

Figure 3:
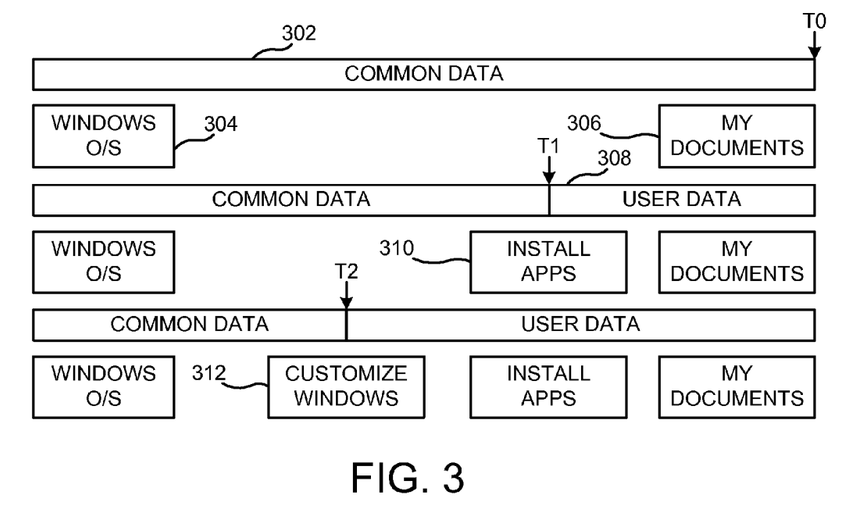
FIG. 3 is a graphical representation of user modification of common data over time.

FIG. 3 is a graphical representation of user modification of common data 302 over time. At time T0, the common data 302 comprises the entire image, with the operating system files 304 in an initially installed state. The user folder 306 is empty at this point. At time T1, the user folder 306 now contains some user data 308, which also may comprise applications 310 which the user has installed. At time T2, operating system customizations 312 have been applied, furthering increasing the proportion of user data 308 in the overall image as seen by the user. The present invention permits the sharing of common data 302 among multiple user clients while incorporating the individual user data 308 into a unique image for each user.

Figure 4:
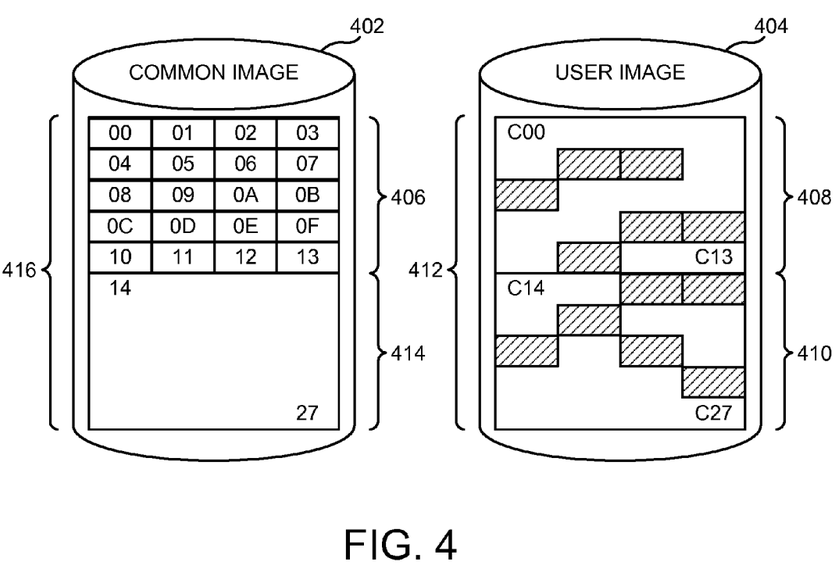
FIG. 4 is a schematic block diagram illustrating a common image and a user image of user-specific modifications.

FIG. 4 is a schematic block diagram illustrating a common image 402 and a user image 404 of user-specific modifications. The common data 302 resides in a common storage area 406 with a common storage address range of 0x00-0x13 in the specific example shown. The user modifications to the common data 302 are shown as right diagonal shaded blocks in a user common storage area 408 with a user common storage address range of 0xC00-0xC13, exactly congruent to the common storage area. Additional user data 308 outside of the common data 302 is also shown as right diagonal shaded blocks in a user local storage area 410 with a user local storage address range of 0xC14-0xC27, contiguous with the user common storage area 408, which together comprise a user storage area 412.

Figure 5:
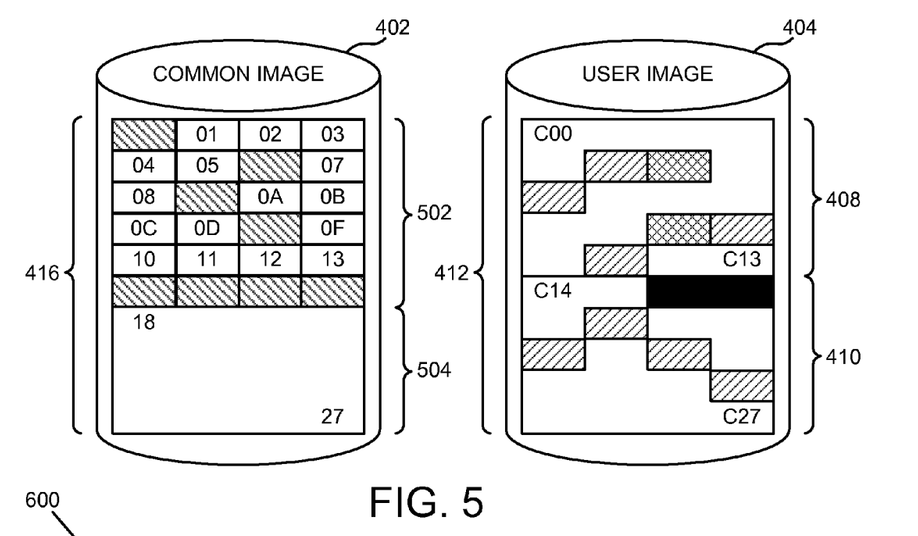
FIG. 5 is a schematic block diagram illustrating updates to the common image and the intersection of the updates with the user image.

A free storage area 414, congruent to the user local storage area 410, may also be provided in the common image 402. The free storage area 414 is contiguous with the common storage area 406, which together comprise an extended common storage area 416. One purpose of the free storage area 414 is to allow for updating and expanding the common storage area, such as for patching an operating system 204 as shared by all user clients. Another purpose may be to allow a single descriptive table, such as a Windows Master File Table ("MFT") to describe both the common image and the user image FIG. 5 is a schematic block diagram illustrating updates to the common image 402 and the intersection of the updates with the user image 404. The updates are shown as left diagonal shaded blocks. The four blocks within the original common storage area 406 are to be moved to locations 0x14-0x17 as annexed from the original free storage area 414, thus creating an expanded common storage area 502 and a diminished free storage area 504.

There are two types of update intersections between the extended common storage area 416 and the user storage area 412. The two cross-hatch shaded blocks within the original user common storage area 408 represent user modifications that must be moved as a result of the update. The two black shaded blocks within the original user local storage area 410 represent user local data that must be relocated to make room for common update data to take its place. The latter situation arises due to the fact that the update is made directly to the common image 402 in physical mode, with the free storage area 414 being seen as available space, whereas the user local storage area 410 overlays the same space in virtual mode.

Figure 6:
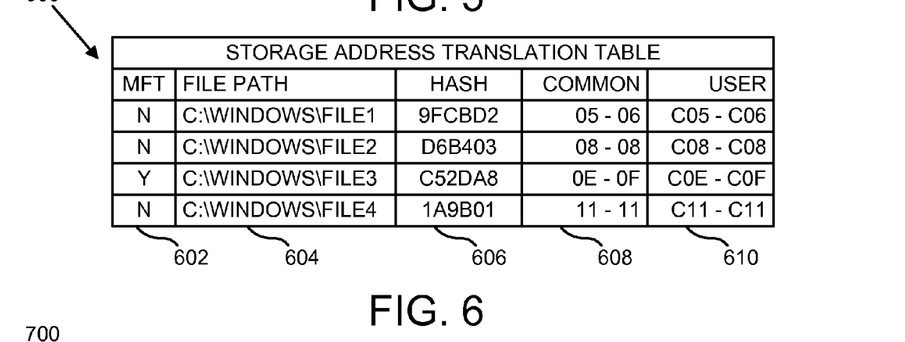
FIG. 6 is a schematic block diagram illustrating a storage address translation table corresponding to the user image.

FIG. 6 is a schematic block diagram illustrating a storage address translation table 600 corresponding to the user image 404, and specifically to the user common storage area 408. Each of the right diagonal shaded blocks or contiguous sets of blocks is represented by an entry in the storage address translation table 600.

A saved MFT flag 602 indicates whether the modified block is part of an MFT file, that is, a file which is small enough to be stored directly in the MFT rather than at the nominal storage address indirectly pointed to by the MFT.

A saved file path 604 indicates the file to which the block belongs. For more efficient table look-up purposes, a saved hash function 606 of the saved file path 604 is also provided. If the hash function does not match, then there is no need to match on the saved file path 604.

A saved common storage address 608 indicates the block within the common storage area 406 that was modified by the user, and the saved user storage address 610 indicates where within user common storage area 408 the modified copy of the block is cached. Note that a range of saved storage addresses may be specified, to allow the specification of a contiguous range of modified blocks in a single entry. As can been seen, the six blocks in this example have been specified by four entries, given that there are two contiguous pairs of blocks.

Figure 7:
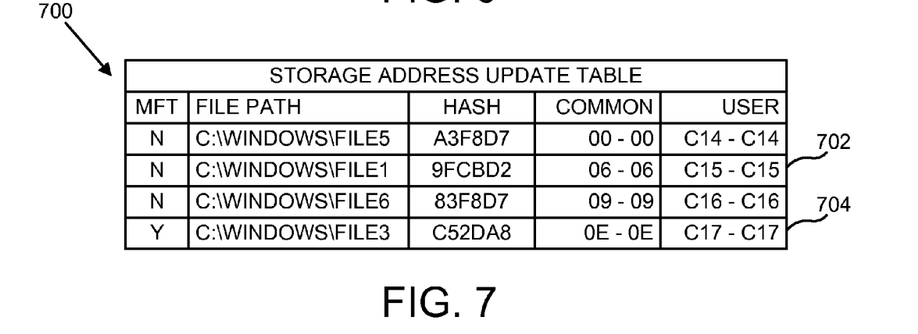
FIG. 7 is a schematic block diagram illustrating a storage address update table corresponding to the updates to the common image.

FIG. 7 is a schematic block diagram illustrating a storage address update table 700 corresponding to the updates to the common image 402. The entry format may be the same as that of the storage address translation table 600. The current location of each of the four blocks to be moved is specified by the saved common storage address 608, and the corresponding target location in the user storage area is specified by the saved user storage address 610. The entries 702 and 704 in the storage address update table 700 are those which intersect with corresponding entries in the storage address translation table 600, as also illustrated by the cross-hatched blocks in FIG. 5.

Figure 8:
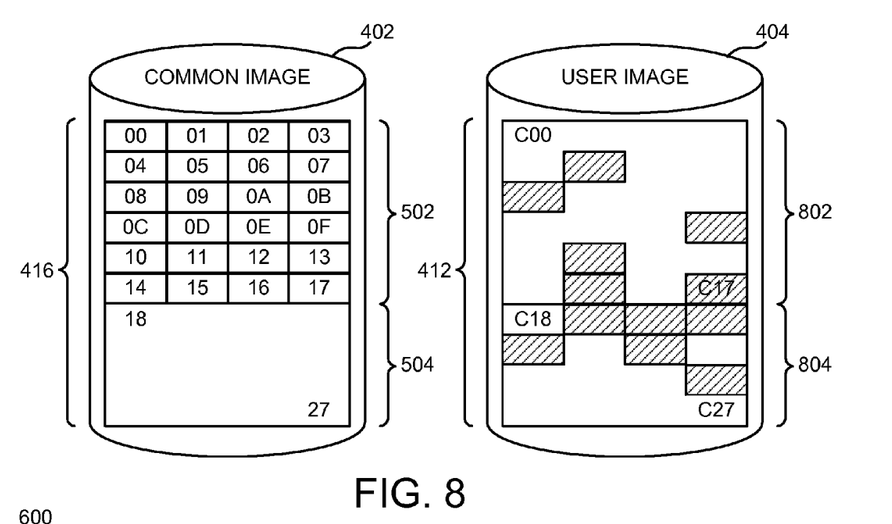
FIG. 8 is a schematic block diagram illustrating the updated common image and updated user image.

FIG. 8 is a schematic block diagram illustrating the updated common image 402 and updated user image 404. As can be seen, the cross-hatched shaded blocks of FIG. 5, formerly located at 0xC06 and 0xC0E, as specified by the storage address translation table 600, have been moved to their new locations at 0xC15 and 0xC17 respectively, as specified by the storage address update table 700. In addition, the black shaded blocks of FIG. 5, formerly located at 0xC16 and 0xC17, have been moved to the formerly vacant locations at 0xC1A and 0xC1B, so as to make room for the blocks taking their place, thus creating an expanded user common storage area 802 and a diminished user local storage area 804. The user common storage address range is now 0xC00-0xC17, and the user local storage address range is now 0xC18-0xC27.

Figure 9:
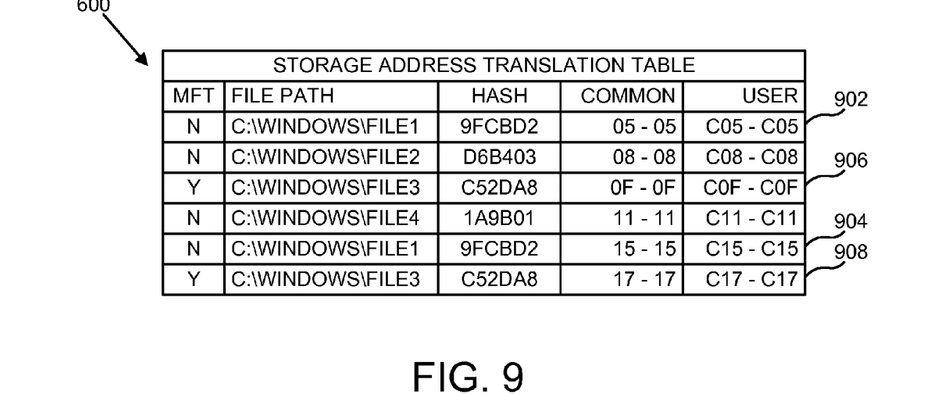
FIG. 9 is a schematic block diagram illustrating an updated storage address translation table corresponding to the updated user image.

FIG. 9 is a schematic block diagram illustrating an updated storage address translation table 600 corresponding to the updated user image 404. Note that the formerly contiguous blocks at 0xC05-0xC06 now require two separate entries 902 and 904, and the formerly contiguous blocks 0xC0E-0xC0F now require two separate entries 906 and 908.

Figure 10:
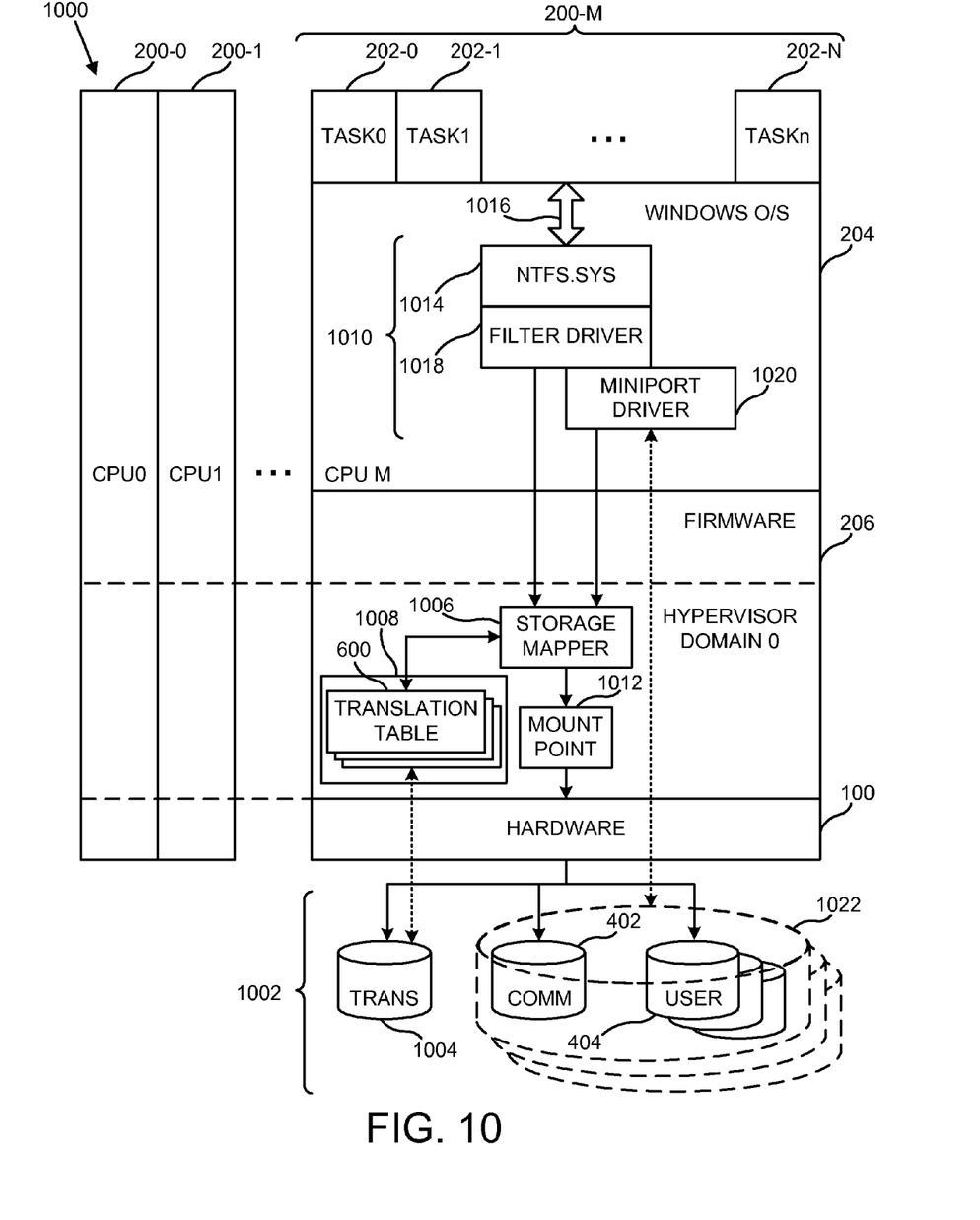
FIG. 10 is a schematic block diagram illustrating a system of the present invention.

FIG. 10 is a schematic block diagram illustrating a system 1000 of the present invention, comprising computers 200-0, 200-1, through 200-M, and a storage subsystem 1002. A non-volatile copy 1004 of the storage address translation tables 600 is provided, there being one storage address translation table 600 per user image 404. In an embodiment, there is one user image per computer 200. Embodiments of the computers 200 may comprise blades, diskless workstations, call center workstations, thin clients, hybrid clients, and POS terminals. In a further embodiment, the storage subsystem 1002 may comprise a SAN or NAS.

A more detailed diagram of the related apparatus is shown for computer 200-M, being representative of each of the computers 200. A single storage mapper module 1006 running in the system-wide hypervisor control domain within the firmware 206 serves the entire system 1000. The storage mapper module 1006 accesses the storage address translation table 600 corresponding to computer 200-M from among the storage address translation tables 600 maintained by the storage address translation table module 1008, in order to map storage access requests from a storage driver stack module 1010 running in the user operating system 204 to the storage subsystem 1002 via a mount point 1012.

The storage driver stack module 1010 comprises several levels of drivers. At the highest level, a file system driver module 1014 receives a storage access call via an application programming interface 1016, and maps the requested file path to a virtual storage address. A filter driver module 1018 then maps the virtual storage address to the requested storage address within the common storage address range if the requested file path is an operating system file path, and within the user storage address range if otherwise. In an embodiment, the common storage address range and the user storage address range comprise disjoint ranges within a single physical storage address space. Corresponding virtual address ranges within a virtual storage address space may be similarly disjoint, and thus may be distinguished on the basis of the virtual storage address, thereby determining whether or not the requested file path is an operating system file path. Lastly, a device driver module 1020 generates device-specific commands in response to the storage access request.

The device as seen by the device driver module 1020 is a virtual drive image 1022 comprised of the common image 402 overlaid by the user image 404 of the corresponding computer 200. One common image 402 is shared by the entire system 1000. A significant savings in physical storage is thus obtained, because the user images 404 are thinly provisioned to store only their respective individual differences from the common image 402, while presenting the appearance of multiple full-size virtual drive images 1022.

Figure 11:
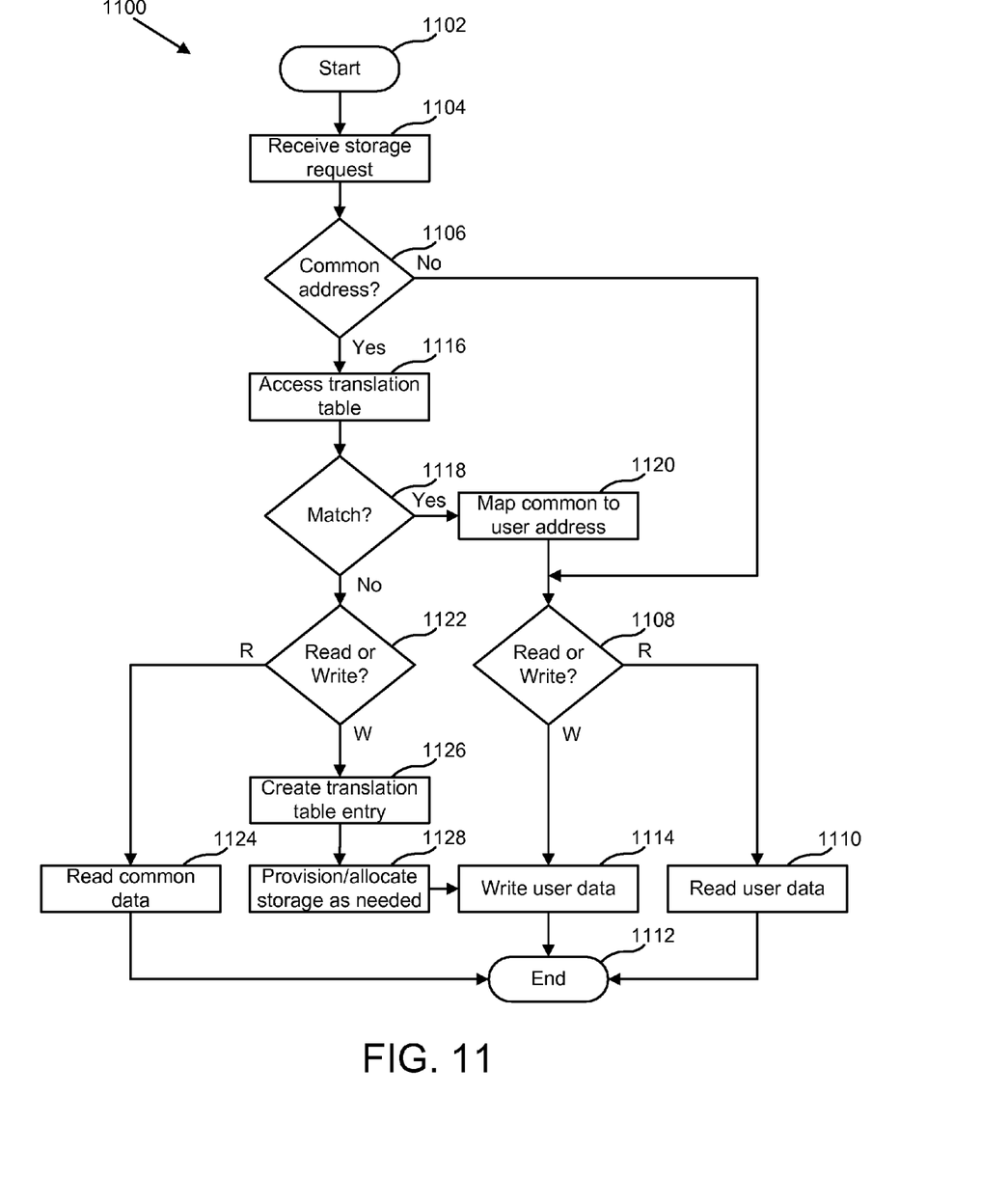
FIG. 11 is a schematic flow chart diagram illustrating one embodiment of a method for storage write caching in accordance with the present invention.

FIG. 11 is a schematic flow chart diagram illustrating one embodiment of a method 1100 for storage write caching in accordance with the present invention. The method 1100 starts 1102 and the storage mapper module 1006 receives 1104 a storage access request with a requested file path and a requested storage address. If the requested storage address is not common 1106, then if the storage access request is a read 1108, the data is read 1110 from the user storage area 412 and the method 1100 ends 1112. If the storage access request is a write 1108, then the data is written 1114 to the user storage area 412 and the method 1100 ends 1112.

If the requested storage address is common 1106, then the storage address translation table 600 is accessed 1116. If an entry matches 1118 wherein the requested file path matches the saved file path 604 and the requested storage address matches the saved common storage address 608, then the saved user storage address 610 is mapped in place of the requested storage address and the method 1100 proceeds as described above wherein the requested storage address is not common 1106. In further embodiment, the saved hash function 606 may be matched against a hash function of the requested file path, thereby avoiding the need to match the requested file path against the saved file path 604 if the hash function did not match.

If no entry matches 1118, then if the storage access request is a read 1122, the data is read 1124 from the common storage area 406 and the method 1100 ends 1112. If the storage access request is a write 1108, then the data is written 1114 to the user storage area 412 and the method 1100 ends 1112. If the storage access request is a write 1122, then a matching entry is created 1126 in the storage address translation table 600. If needed, a thin region of physical storage is provisioned and allocated 1128, and the data is written 1114 to the user storage area 412 and the method 1100 ends 1112.

Figure 12:
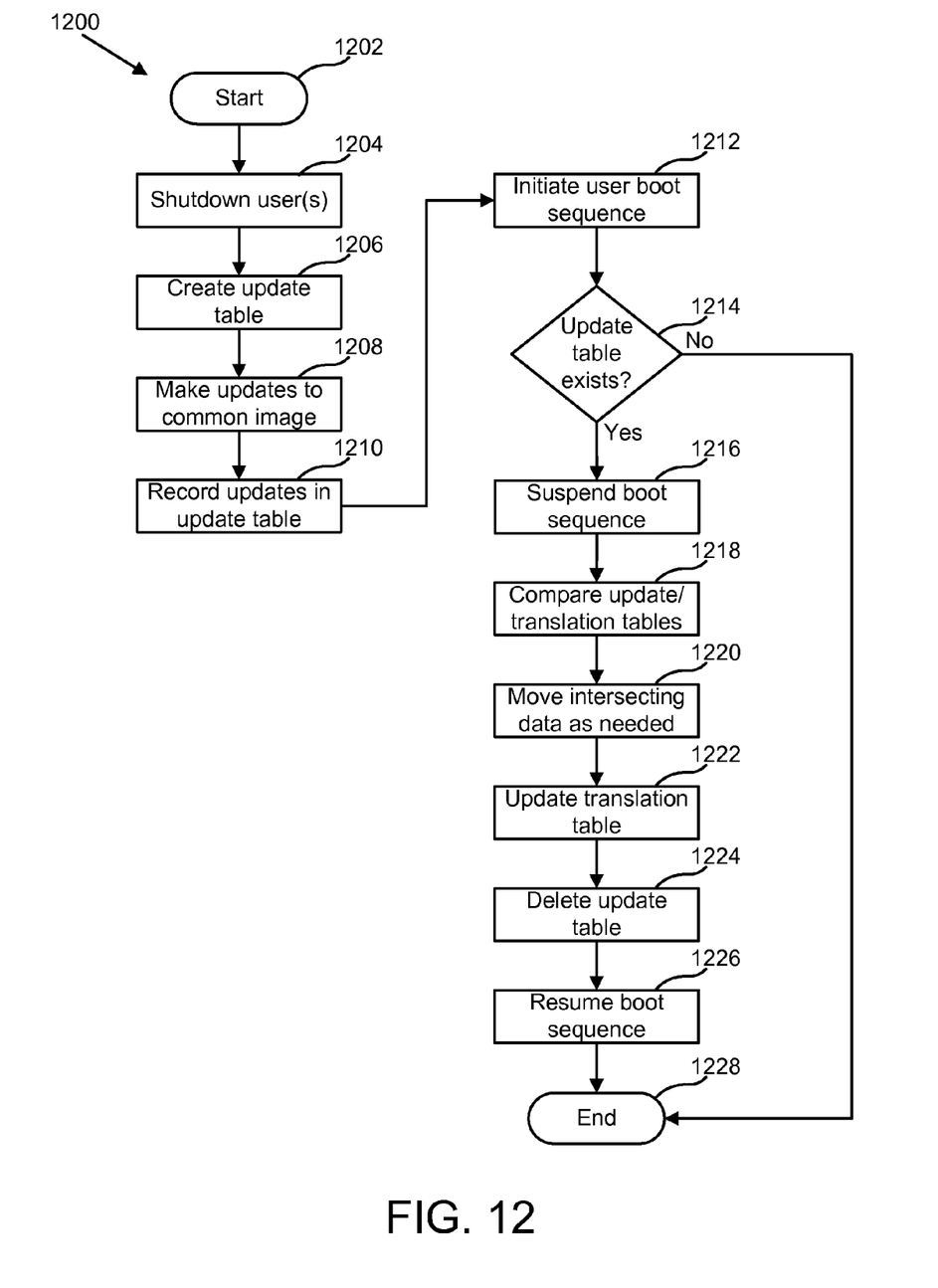
FIG. 12 is a schematic flow chart diagram illustrating one embodiment of a method for updating a common image in accordance with the present invention.

FIG. 12 is a schematic flow chart diagram illustrating one embodiment of a method 1200 for updating a common image 402 in accordance with the present invention. The method 1200 starts 1202 and the user client(s) are shut down 1204. A storage address update table 700 is created 1206 for each user client. Updates are made 1208 to the common image 402 and recorded 1210 in the storage address update table 700.

A boot sequence of the operating system 204 is initiated 1212 for each user client. If the storage address update table 700 does not exist, then the method 1200 ends 1228. Otherwise, the boot sequence is suspended 1216. The storage address update table 700 is compared 1218 with the storage address translation table 600 to determine any intersection between them. Any intersections thus defined are then moved 1220 to the user locations specified in the storage address update table 700 and any user data displaced thereby to alternate locations available in the user storage area 412. The storage address translation table 600 is then updated 1222 to reflect the data movement 1220, and the storage address update table 700 is deleted 1224. The boot sequence is resumed 1226 and the method 1200 ends 1228.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
  a storage address translation table module that maintains a storage address translation table wherein each entry of the storage address translation table comprises a saved file path, a saved common storage address within a common storage address range of a common storage area, and a saved user storage address within a user common storage address range of a user common storage area, wherein the user common storage area is congruent to and overlays the common storage area to incorporate user modification of common data into a unique image for each user; and
  a storage mapper module that
    receives a storage access request,
    accesses the storage address translation table,
    looks up a matching entry in the storage address translation table wherein the requested file path matches the saved file path and the requested storage address matches the saved common storage address,
    maps the saved user storage address from the matching entry as a mapped storage address if the matching entry exists, and
    passes through the requested storage address as the mapped storage address if the matching entry does not exist
    wherein the storage address translation table module and storage mapper module comprise one or more of circuitry and executable code, the executable code stored on one or more tangible storage devices.

2. The apparatus of claim 1, wherein a user local storage address range of a user local storage area contiguous to the user common storage address range of the user common storage area together comprise a user storage address range of a user storage area, and the requested storage address range comprises both the common storage address range and the user local address range,
  the storage driver stack module is configured to be hosted by an operating system, and
  the storage mapper module is configured to be hosted by a hypervisor control domain.

3. The apparatus of claim 2, wherein the storage driver stack module further comprises at least one module selected from the set consisting of:
  a file system driver module that maps the requested file path to a virtual storage address;
  a filter driver module that maps the virtual storage address to the requested storage address within the common storage address range if the requested file path is an operating system file path, and within the user storage address range if otherwise; and
  a device driver module that generates device-specific commands in response to the storage access request.

4. The apparatus of claim 3, wherein the requested file path is determined to be an operating system file path if the virtual storage address falls within a given storage address range of a storage address space.

5. The apparatus of claim 2, wherein a free storage area, congruent to the user local storage area, and contiguous to the common storage area, together comprise an extended common storage area which is congruent to the user storage area and thus able to be equivalently described by a descriptive table of the user storage area.

6. The apparatus of claim 5, wherein the operating system is Windows, the descriptive table comprises an MFT, and the storage access request further comprises an MFT flag to indicate whether the requested file path specifies a file that is MFT-resident rather than actually residing at the requested storage address, and each entry of the storage address translation table further comprises a saved MFT flag to be matched against the MFT flag.

7. The apparatus of claim 1, wherein the storage address translation table further comprises a saved hash function of the saved file path to be matched against a hash function of the requested file path, thereby avoiding the need to match the requested file path against the saved file path if the hash function did not match.

8. A system comprising:
a storage address translation table module that maintains a plurality of storage address translation tables wherein each entry of the storage address translation table comprises a saved file path, a saved common storage address within a common storage address range of a common storage area, and a saved user storage address within a user common storage address range of a user common storage area, wherein the user common storage area is congruent to and overlays the common storage area to incorporate user modification of common data into a unique image for each user;
a plurality of storage driver stack modules that each receives a storage access call via an application programming interface and generates a storage access request with a requested file path and a requested storage address within a requested storage address range;
a storage mapper module that
receives the storage access request,
accesses the storage address translation table,
looks up a matching entry in the storage address translation table wherein the requested file path matches the saved file path and the requested storage address matches the saved common storage address,
maps the saved user storage address from the matching entry as a mapped storage address if the matching entry exists, and
passes through the requested storage address as the mapped storage address if the matching entry does not exist,
a storage subsystem comprising the foregoing storage areas; and
a plurality of computers in which the foregoing modules reside
wherein the storage address translation table module, storage driver stack modules, and storage mapper module comprise one or more of circuitry and executable code, the executable code stored on one or more tangible storage devices.

9. The system of claim 8, wherein a user local storage address range of a user local storage area contiguous to the user common storage address range of the user common storage area together comprise a user storage address range of a user storage area, and the requested storage address range comprises both the common storage address range and the user local address range.

10. The system of claim 9, wherein a virtual drive image for each computer corresponds to the user storage area overlaid on the common storage area.

11. The system of claim 8, wherein the plurality of computers is selected from the set consisting of blades, diskless workstations, call center workstations, thin clients, hybrid clients, handhelds, notebooks, and POS terminals.

12. The system of claim 8, wherein the storage subsystem is selected from the set consisting of a NAS and a SAN.

13. A computer program product comprising computer usable program code executable to perform operations, the executable code stored on one or more tangible storage devices, the operations of the computer program product comprising:
receiving a storage access request with a requested file path and a requested storage address within a requested storage address range;
accessing a storage address translation table wherein each entry of the storage address translation table comprises a saved file path, a saved common storage address within a common storage address range of a common storage area, and a saved user storage address within a user common storage address range of a user common storage area, wherein the user common storage area is congruent to and overlays the common storage area to incorporate user modification of common data into a unique image for each user;
looking up a matching entry in the storage address translation table wherein the requested file path matches the saved file path and the requested storage address matches the saved common storage address;
mapping the saved user storage address from the matching entry as a mapped storage address if the matching entry exists; and
passing through the requested storage address as the mapped storage address if the matching entry does not exist.

14. The computer program product of claim 13, wherein a user local storage address range of a user local storage area contiguous to the user common storage address range of the user common storage area together comprise a user storage address range of a user storage area, and the requested storage address range comprises both the common storage address range and the user local address range, and wherein the computer program product further comprises an operation of checking whether the requested storage address falls within the user local storage address range, thereby implying that the matching entry does not exist without having to perform the operation of accessing.

15. The computer program product of claim 13, wherein the storage access request is a read, further comprising an operation of reading storage data as designated by the mapped storage address.

16. The computer program product of claim 13, wherein the storage access request is a write, further comprising the operations of:
creating the matching entry if it does not exist and the requested storage address is within the common storage address range, wherein the saved file path is comprised of the requested file path, the saved common storage address is comprised of the requested storage address, and the saved user storage address is comprised of an address within the user common storage address range corresponding to the requested storage address within in the common storage address range; and
writing storage data as designated by the mapped storage address.

17. The computer program product of claim 16, further comprising the operations of:
provisioning a thin region of physical storage as needed; and
allocating the thin region of physical storage thus provisioned so as to accommodate the storage data as designated by the mapped storage address within the user storage address range.

18. A machine-implemented method comprising the steps of:
receiving a storage access request with a requested file path and a requested storage address within a requested storage address range;
accessing a storage address translation table wherein each entry of the storage address translation table comprises a saved file path, a saved common storage address within a common storage address range of a common storage area, and a saved user storage address within a user common storage address range of a user common storage area, wherein the user common storage area is congruent to and overlays the common storage area to incorporate user modification of common data into a unique image for each user;
looking up a matching entry in the storage address translation table wherein the requested file path matches the saved file path and the requested storage address matches the saved common storage address;
mapping the saved user storage address from the matching entry as a mapped storage address if the matching entry exists; and
passing through the requested storage address as the mapped storage address if the matching entry does not exist.

19. The method of claim 18, wherein a user local storage address range of a user local storage area contiguous to the user common storage address range of the user common storage area together comprise a user storage address range of a user storage area, and the requested storage address range comprises both the common storage address range and the user local address range, and wherein the method further comprises a step of checking whether the requested storage address falls within the user local storage address range, thereby implying that the matching entry does not exist without having to perform the step of accessing.

20. The method of claim 18, wherein the storage access request is a read, further comprising a step of reading storage data as designated by the mapped storage address.

21. The method of claim 18, wherein the storage access request is a write, further comprising the steps of:
creating the matching entry if it does not exist and the requested storage address is within the common storage address range, wherein the saved file path is comprised of the requested file path, the saved common storage address is comprised of the requested storage address, and the saved user storage address is comprised of an address within the user common storage address range corresponding to the requested storage address within in the common storage address range; and
writing storage data as designated by the mapped storage address.

22. The method of claim 21, further comprising the steps of:
provisioning a thin region of physical storage as needed; and
allocating the thin region of physical storage thus provisioned so as to accommodate the storage data as designated by the mapped storage address within the user storage address range.

23. The method of claim 18, wherein a free storage area, congruent to the user local storage area, and contiguous to the common storage area, together comprise an extended common storage area which is congruent to the user storage area, the method further comprising the steps of:
making updates to the common storage area, potentially enlarging it so as to encroach upon and commensurately diminish the free storage area;
recording the updates in a storage address update table having a format like that of the storage address translation table; and
repairing the user storage area and the storage address translation table to reflect the updates recorded in the storage address update table.

24. The method of claim 23, wherein the common storage area contains an operating system, the method further comprising the steps of:
initiating a boot sequence of the operating system;
suspending the boot sequence if the storage address update table exists;
the step of repairing comprising the steps of:
comparing the storage address update table with the storage address translation table to determine any intersections between them;
moving the intersections thus identified to user locations specified in the storage address update table and any user data displaced thereby to alternate locations available in the user storage area;
updating the storage address translation table to reflect the alternate locations thus utilized;
deleting the storage address update table; and
resuming the boot sequence of the operating system.

25. The method of claim 24, wherein the operating system is Windows, the method further comprising a step of updating an MFT as needed to reflect the alternate locations thus utilized.

* * * * *